Figure 1:
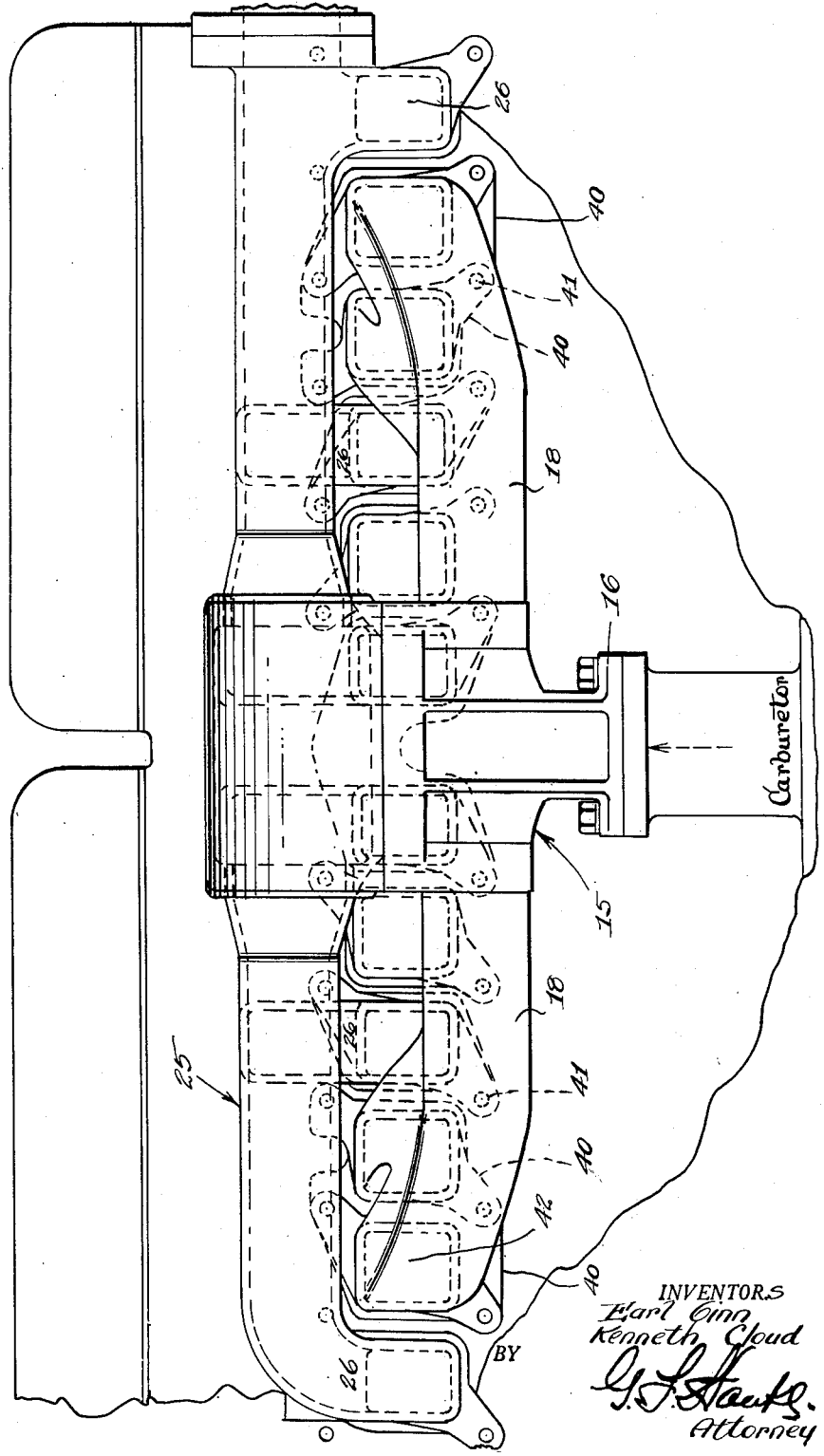

March 21, 1944.  E. GINN ET AL  2,344,863
INTERNAL COMBUSTION ENGINE
Filed April 9, 1942  4 Sheets-Sheet 1

INVENTORS
Earl Ginn
Kenneth Cloud
BY
Attorney

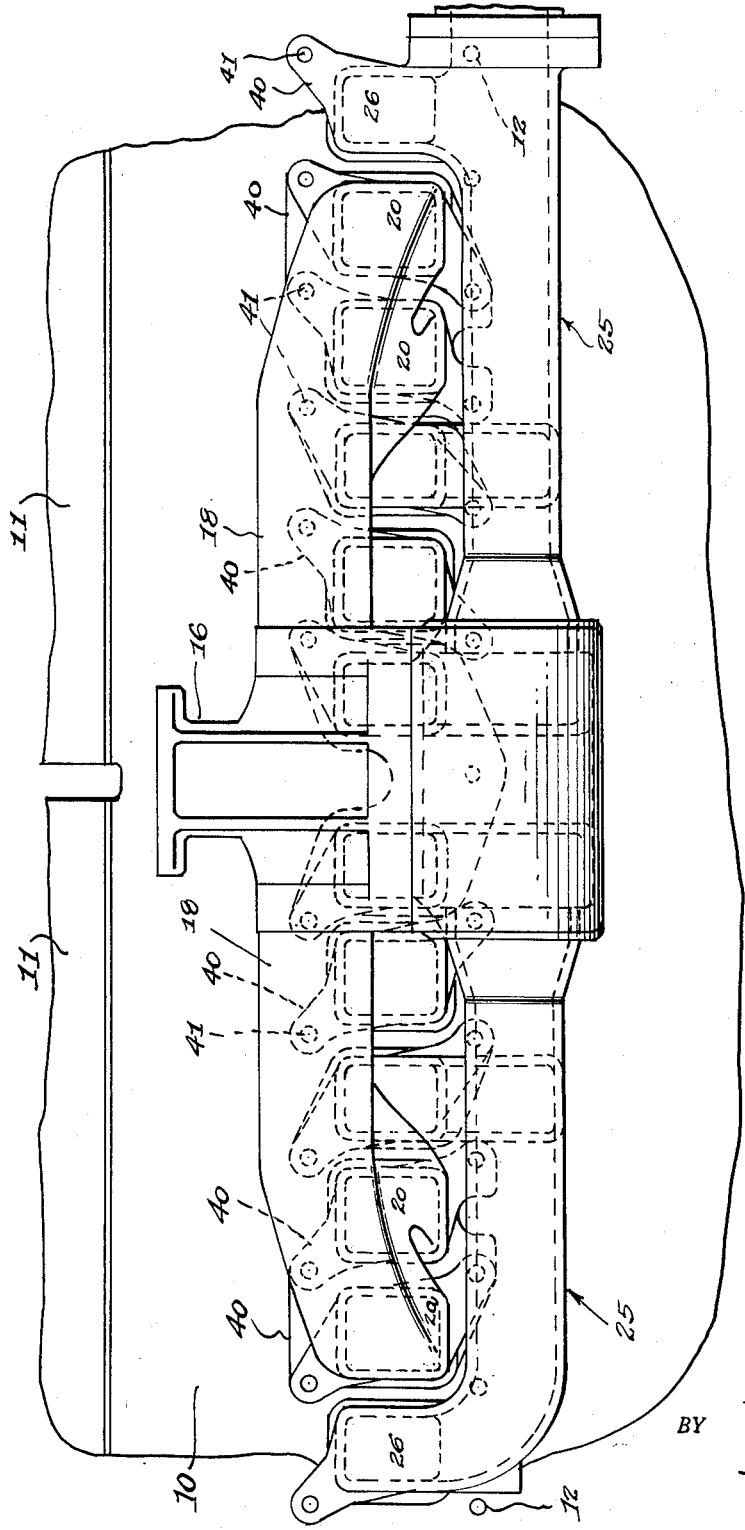

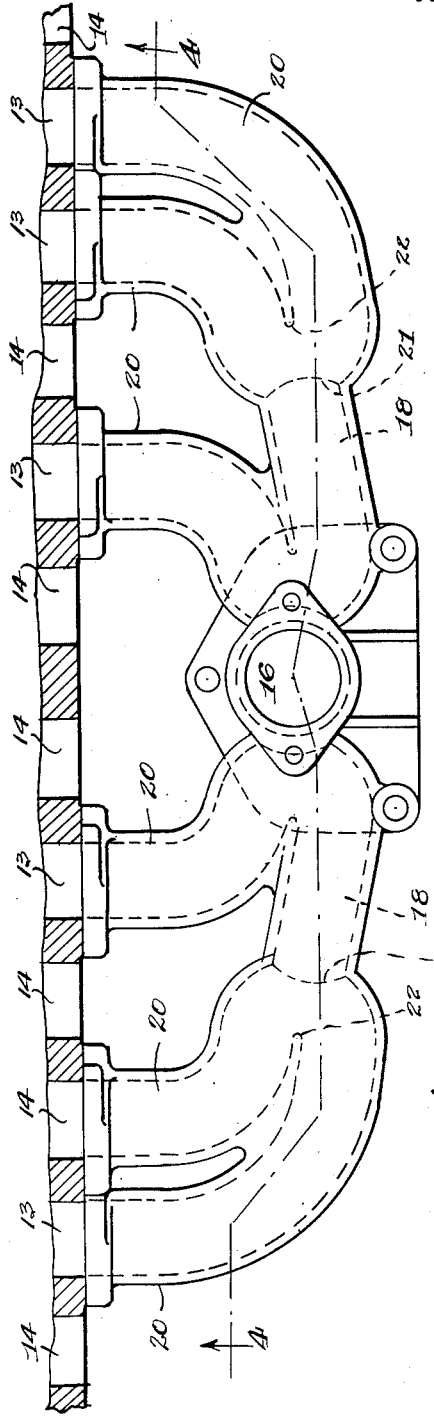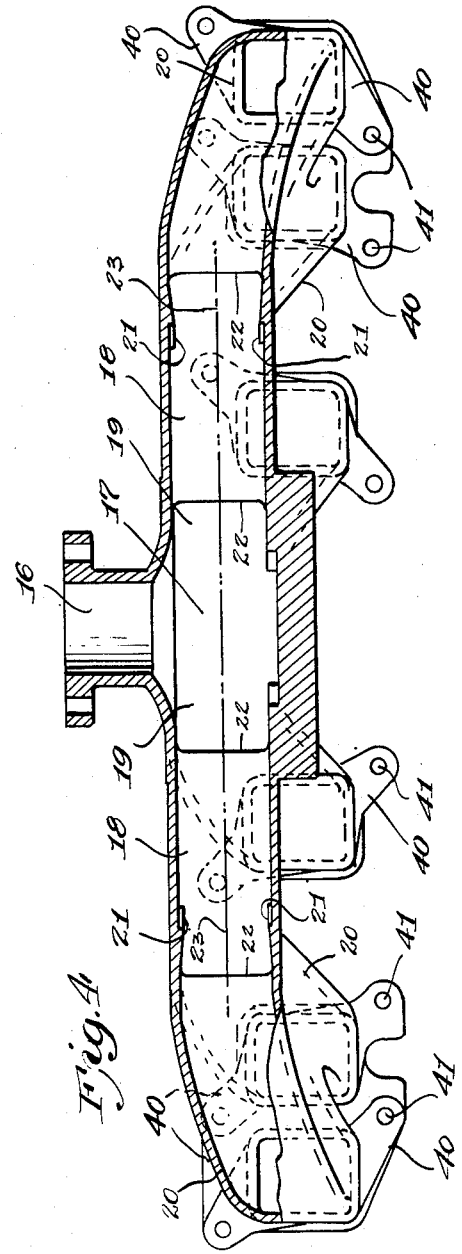

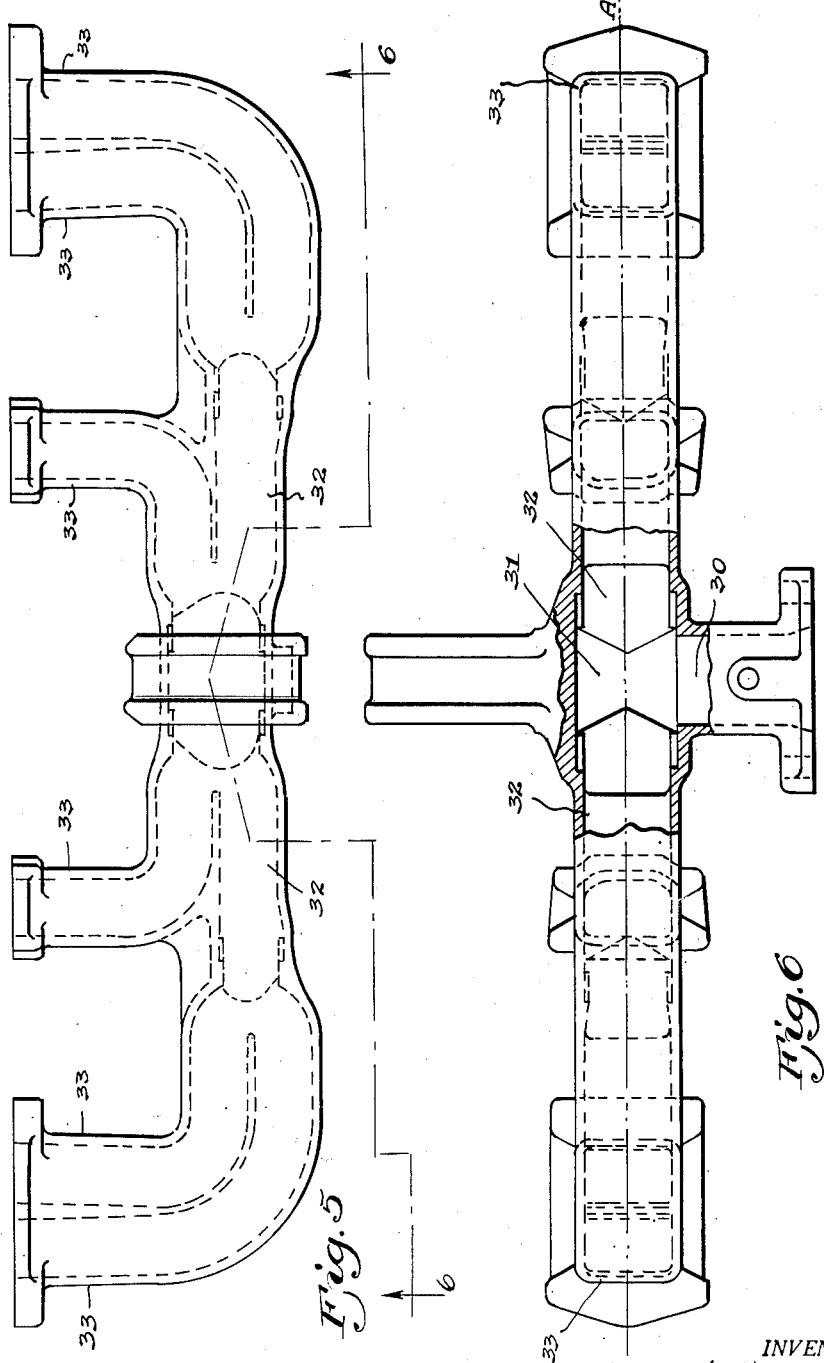

Patented Mar. 21, 1944

2,344,863

UNITED STATES PATENT OFFICE 2,344,863

INTERNAL COMBUSTION ENGINE

Earl Ginn, North Muskegon, and Kenneth Cloud, Muskegon, Mich., assignors to Continental Motors Corporation, Muskegon, Mich., a corporation of Virginia Application April 9, 1942, Serial No. 438,245.

10 Claims. (Cl. 123—52)

Our invention relates to an internal combustion engine and more particularly to the intake and exhaust manifold structures and to their construction and novel assembly with said internal combustion engine.

At the present time it is quite customary to use either an updraft or downdraft carburetion system with engines, their use depending largely upon various structural limitations in the application of the power unit. The application of the power unit is of particular importance for a manufacturer of engines for these general power applications, and it has been the aim of such manufacturers to facilitate the production of these engines in order to adapt same for the particular application with a minimum of expense and the requirement for the maintenance of a minimum of service parts. In the past it has been the general practice to provide manifold structures of particular design and which are constructed specifically for the application to either an updraft or a down-draft carburetion engine. The suggestion of reversing the manifold structures is easier said than done since the reversing of the conventional structure was more or less impractical because of other limiting factors.

An object of our present invention is to eliminate the aforesaid difficulties by providing an intake and exhaust manifold structure and assembly which permits the reversal of these structures about a horizontal plane of the engine with a minimum of manufacturing changes.

More particularly, it is the object of our invention to facilitate the production of engines for general power application by providing a manifold structure constructed with parts substantially symmetrical about their horizontal longitudinal central plane, so that same may be reversed with respect to said plane, and adapted for assembly with either an updraft or a downdraft carburetor engine with no structural manifold change whatsoever, thereby affecting the production of such engines at a minimum of manufacturing expense and with a minimum of maintenance of service parts.

Another object of our present invention is to provide for a reversible manifold structure in which the intake manifold is constructed with fuel flow controlling and distributing means and with individual port runners or fuel conducting portions, said fuel controlling and distributing means embodied in the internal manifold structure and so constructed and arranged in symmetrical relationship as to adapt same for operation with either a down-draft or updraft carburetion engine, this symmetrical arrangement of parts including a symmetrical construction of the port connecting the port runners with the secondary fuel conducting portion of the manifold structure.

A further object of our present invention is to provide an efficient assembly of a manifold structure of the character described by so constructing and arranging the manifold structures with hold down flanges adjacent their ports connecting same with the engine cylinders, with respect to bolt receiving holes carried by the engine structure, so that the bolt holes in the hold down flanges register respectively with the bolt holes in the cylinder structure either when the manifold structure is assembled with an engine of the updraft carburetion type or reversed for assembly with one of the down-draft carburetion type.

A still further object of our invention is to construct an efficient manifold structure of the character described by providing intake and exhaust manifolds constructed with oppositely inclined port runners in order to more efficiently function with either an updraft carburetion engine or a downdraft carburetion engine.

For a more detailed understanding of our invention reference may be had to the accompanying drawings illustrating preferred embodiments thereof and in which:

Fig. 1 is a side elevational view of an engine equipped with our improved manifold structure and positioned for assembly with an updraft carburetion engine, Fig. 2 is a similar view illustrating the same manifold construction positioned for assembly with a down draft carburetion engine, Fig. 3 is a plan view of the intake manifold structure used with the assembly illustrated in Figs. 1 and 2, Fig. 4 is a sectional view of the intake manifold structure taken on the line 4—4 of Fig. 3, Fig. 5 is a plane view of an intake manifold structure of modified structure, and Fig. 6 is an elevational view thereof with a portion broken away and shown in section as taken substantially on the line 6—6 of Fig. 5.

The engine illustrated in Figs. 1 and 2 consists of an engine cylinder block 10 to which is secured a conventional cylinder head structure 11. The engine cylinder block carries suitable bolt holes 12 which are preferably tapped in the usual manner but which are longitudinally aligned and preferably, substantially uniformly spaced on the side of the engine block, symmetrically with respect to the engine intake or exhaust ports 13 and 14 respectively. It will be noted that these holes are vertically aligned in pairs, one hole being disposed beneath the other.

The intake manifold structure comprises a primary fuel conducting portion 16 terminating in a fuel distributing chamber 17, secondary fuel conducting portions 18 connected with the ends only of said chamber as at 19, and with port runners or individual branch passages 20. The secondary fuel conducting portions are provided with fuel flow impeding means, such as arcuate dams 21 and splits 22, which are constructed symmetrically with respect to the longitudinal horizontal central plane 23 of the secondary fuel conducting portions so that these impeding means act upon the fuel flow irrespective of the positioning of the manifold structure; that is, it is operable as efficiently when assembled to an engine as shown in Fig. 1 as it is when assembled with an engine in a manner as shown in Fig. 2. In the preferred construction as illustrated in Figs. 1 to 4 inclusive these port runners or branch passages are inclined to the horizontal plane. In Fig. 1 the port runners are inclined to the horizontal plane. In Fig. 1 the port runners are inclined upwardly while in Fig. 2, which shows the manifold structures reversed, the port runners are inclined downwardly.

The exhaust manifold structure 25 comprises a longitudinal conducting portion connected with inclined port runners or branch passages 26. It will be noted that the longitudinal conducting portions of both the intake and exhaust manifold structures are constructed and arranged to extend approximately parallel with each other and they are respectively provided with oppositely inclined port runners or branch passages.

In the modified construction illustrated in Figs. 5 and 6, the intake manifold structure comprises a primary conducting portion 30, a distributing chamber 31, and secondary conducting portions 32 extending longitudinal of the engine and connecting the distributing chamber with individual port runners or branch passages 33. In this modified construction the distributing chamber, the secondary and branch passages, as well as the manifold outlet ports, are all constructed symmetrical with respect to the horizontal plane A—A, and it will be readily seen that the structure will function equally as well with a down draft carburetion engine as with an updraft carburetion engine. It may be more particularly noted, that the port openings connecting the secondary passages with the branch passages are also symmetrically constructed relative to this plane A—A as will be readily seen by observing Fig. 6.

This construction will usually be assembled with an exhaust manifold structure but it is customary with this type of intake manifold to not reverse the position of the exhaust manifold as is done with the construction illustrated in Figs. 1 and 2.

It will be noted that the reversal assembly of these manifold assemblies to the engine is made possible by the arrangement of the port holes 12 carried by the engine block and the particular construction of the flange portions carried by said manifold structures. These flange portions 40 of the intake manifold structure carry openings or holes 41 disposed diagonally diametrically opposite from each other, and each flange portion preferably carries a pair of such openings. It will be noted that the lower flange opening 41 of one flange portion is disposed immediately below and vertically aligned with the upper opening carried by an adjacent flange opening. These openings or tapped holes in the cylinder structure are preferably equally spaced above and below the horizontal plane 42 containing the centers of the cylinder intake and exhaust ports. Thus, the intake and exhaust manifold structures illustrated in Figs. 1 and 2 are readily reversed from the position and arrangement shown particularly in Fig. 1 to that position and arrangement shown particularly in Fig. 2, and it will be noted that at least some of the cylinder bolt holes are constructed and arranged to interchangeably register with the port openings in the flange portions carried by said intake and exhaust manifold structures.

Although I have illustrated but one form of my invention and have described in detail but a single application thereof, it will be apparent to those skilled in the art to which my invention pertains, that various modifications and changes may be made therein without departing from the spirit of my invention or from the scope of the appended claims.

We claim:

1. A fuel induction system for an internal combustion engine comprising a source of fuel supply a primary fuel conducting portion, a primary fuel distributing chamber, and secondary fuel conducting passages connecting the ends only of said chamber with the engine cylinders and including branch passages, said secondary passages having identically constructed top and bottom walls provided with identically constructed intermediate fuel flow controlling means comprising arcuate dams facing the fuel flow, whereby to permit reversing of same in assembly with the engine.

2. A fuel induction system for an internal combustion engine comprising a source of fuel supply, a primary fuel conducting portion, a primary fuel distributing chamber, and fuel conducting passages connecting the ends only of said chamber with the engine cylinders and including secondary passages and branch passages connected with said secondary fuel conducting passages, said secondary passages having intermediate fuel flow controlling means comprising arcuate dams facing the fuel flow and constructed symmetrical with respect to the longitudinal horizontal central plane thereof, said secondary and branch passages being both constructed with identically constructed top and bottom flat walls and symmetrical with respect to the horizontal longitudinal plane containing the longitudinal axis of said induction system, the port openings connecting said branch and secondary passages being identical in area, axially aligned and symmetrically arranged relative to said plane.

3. A fuel induction system for an internal combustion engine comprising a source of fuel supply, an intake manifold structure secured to said engine and including a primary fuel conducting portion, a primary fuel distributing chamber, and secondary fuel conducting passages having identically constructed top and bottom walls and connecting the ends only of said chamber with the engine cylinders, said secondary passages having having intermediate fuel flow controlling means comprising arcuate dams facing the fuel flow and constructed symmetrical with respect to the longitudinal horizontal central plane thereof, and branch passages comprising separate passages individually connecting the secondary passages with the engine cylinders, said branch passages inclined to the horizontal central plane of said secondary branches.

4. A fuel induction system for an internal combustion engine comprising a source of fuel supply, an intake manifold structure secured to said engine and including a primary fuel conducting portion, a primary fuel distributing chamber, secondary fuel conducting passages connecting the ends only of said chamber, said secondary passages having intermediate fuel flow controlling means comprising dams facing the fuel flow and constructed with identically constructed top and bottom walls and symmetrical with respect to the longitudinal horizontal central plane thereof, and a plurality of branch passages comprising separate passages individually connecting the secondary passages with the engine cylinders, said branch passages inclined to the horizontal central plane of said secondary branches, the ports directly connecting said secondary and branch passages being constructed identical in area and arranged symmetrical relative to the aforesaid longitudinal horizontal central plane of said secondary passages whereby to permit 180 degree reversing of said intake manifold structure and assembly with the engine for updraft or downdraft carburetion.

5. A reversible exhaust and intake manifold assembly for an internal combustion engine comprising separate intake and exhaust manifold structures each having longitudinally extending parallel conducting portions and inclined port conducting portions, the port conducting portions of said intake and exhaust manifold structures being oppositely inclined, said port conducting portions of both said intake and exhaust manifold structures terminating in port flange portions having horizontally longitudinally aligned bolt openings arranged for interchangeable registration one with the other with longitudinally aligned bolt receiving holes carried by the engine, said intake and exhaust manifold structures constructed and arranged for reversible assembly with the engine about an engine horizontal plane extending parallel to longitudinally extending conducting portions of said manifold structures.

6. A reversible exhaust and intake manifold assembly for an internal combustion engine comprising separate intake and exhaust manifold structures each having longitudinally extending parallel conducting portions and inclined port conducting portions, the port conducting portions of said intake and exhaust manifold structures being oppositely inclined, said port conducting portions of both said intake and exhaust manifold structures terminating in port flange portions having horizontally longitudinally aligned bolt openings arranged for interchangeable registration one with the other with longitudinally aligned bolt receiving holes carried by the engine, said intake and exhaust manifold structures constructed and arranged for reversible assembly with the engine about an engine horizontal plane extending parallel to the longitudinally extending conducting portions of said manifold structures, and when so reversed some of the bolt openings carried by the intake manifold structure registering with engine bolt openings receiving holes previously registering with belt openings carried by said exhaust manifold structure.

7. A reversible exhaust and intake manifold assembly for an internal combustion engine comprising separate intake and exhaust manifold structures each having longitudinal extending parallel conducting portions and inclined port conducting portions, the port conducting portions of said intake and exhaust manifold structures being oppositely inclined, said port conducting portions of both said intake and exhaust manifold structures terminating in port flange portions having horizontally longitudinally aligned bolt openings arranged for interchangeable registration one with the other with longitudinally aligned bolt receiving holes carried by the engine, said intake and exhaust manifold structures constructed and arranged for reversible assembly with the engine about an engine horizontal plane extending parallel to the longitudinally extending conducting portions of said manifold structures, and when so reversed some of the bolt openings carried by the intake manifold structure registering with the bolt holes of said engine formerly registering with bolt openings carried by said exhaust manifold structure, the bolt openings of said manifold structures being diagonally disposed relative to each other.

8. A reversible exhaust and intake manifold assembly for an internal combustion engine comprising separate intake and exhaust manifold structures each having longitudinally extending parallel conducting portions and inclined port conducting portions, the port conducting portions of said intake and exhaust manifold structures being oppositely inclined, said port conducting portions of both said intake and exhaust manifold structures terminating in port flange portions having horizontally longitudinally aligned bolt openings arranged for interchangeable registration one with the other with longitudinally aligned bolt receiving holes carried by the engine, said intake and exhaust manifold structures constructed and arranged for reversible assembly with the engine about an engine horizontal plane extending parallel to the longitudinally extending conducting portions of said manifold structures, and when so reversed some of the bolt openings carried by the intake manifold structure registering with the bolt holes of said engine formerly registering with bolt openings carried by said exhaust manifold structure, the flange portions of each of said manifold structures having a pair of openings diagonally diametrically disposed to either side of the manifold ports.

9. A reversible intake and intake manifold assembly for an internal combustion engine comprising separate intake and exhaust manifold structures each having longitudinally extending parallel conducting portions and inclined port conducting portions, the port conducting portions of said intake and exhaust manifold structures being oppositely inclined, said port conducting portions of both said intake and exhaust manifold structures terminating in port flange portions having horizontally longitudinally aligned bolt openings arranged for interchangeable registration one with the other with longitudinally aligned bolt receiving holes carried by the engine, said intake and exhaust manifold structures constructed and arranged for reversible assembly with the engine about an engine horizontal plane extending parallel to longitudinally extending conducting portions of said manifold structures, and when so reversed some of the bolt openings carried by the intake manifold structure registering with the bolt holes of said engine formerly registering with bolt openings carried by said exhaust manifold structure, the flange portions of each of said manifold structures having a pair of openings diagonally diametrically disposed to either side of the manifold ports, the lower bolt opening in one port flange portion being disposed directly below the upper bolt opening of an adjacent port flange portion.

10. A reversible exhaust and intake manifold assembly for an internal combustion engine comprising separate intake and exhaust manifold structures each having longitudinally extending parallel conducting portions and inclined port conducting portions, the port conducting portions of said intake and exhaust manifold structures being oppositely inclined, said port conducting portions of both said intake and exhaust manifold structures terminating in port flange portions having horizontally longitudinally aligned bolt openings arranged for interchangeable registration one with the other with longitudinally aligned bolt receiving holes carried by the engine, said intake and exhaust manifold structures constructed and arranged for reversible assembly with the engine about an engine horizontal plane extending parallel to longitudinally extending conducting portions of said manifold structures, and when so reversed some of the bolt openings carried by the intake manifold structure registering with the bolt holes of said engine formerly registering with bolt openings carried by said exhaust manifold structure, the flange portions of each of said manifold structures having a pair of openings diagonally diametrically disposed to either side of the manifold ports, the lower bolt opening in one port flange portion being disposed directly below and vertically aligned with the upper bolt opening of an adjacent port flange portion and also interchangeably positioned on reversing the manifold structures about said horizontal engine plane when interchangeably assembling the manifold structures with an engine having either updraft or downdraft carburetion.

EARL GINN.
KENNETH CLOUD.